United States Patent Office 3,179,195
Patented Apr. 20, 1965

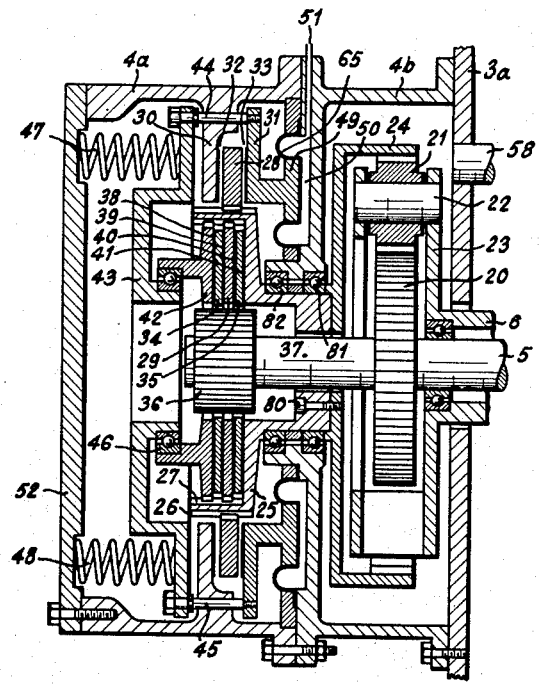
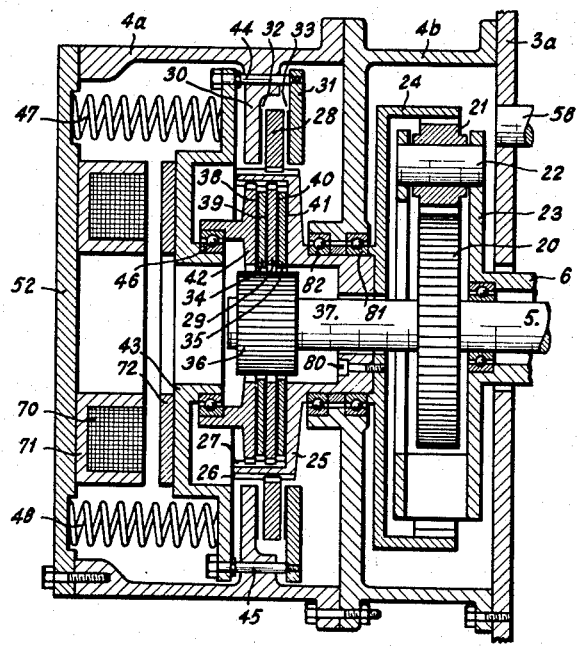

3,179,195
ELECTRIC DRIVING WHEEL FOR A PNEUMATIC TIRED VEHICLE
Gabriel Bouladon and Paul Zuppiger, Carouge, Geneva, Switzerland, assignors to Automobiles M. Berliet, Lyon, France, a firm
Filed July 17, 1962, Ser. No. 210,436
Claims priority, application Switzerland, July 17, 1961, 8,389/61
11 Claims. (Cl. 180—10)

The present invention relates to an electric driving wheel for a pneumatic tired vehicle, comprising an electric motor mounted in the hub of the wheel and a speed-reduction gear interposed between the motor shaft and the rim of the wheel.

In existing constructions the reduction gear has a fixed transmission ratio which cannot be changed during service; this is a disadvantage, particularly on starting.

Actually, it is either necessary for the motor to be of sufficient dimensions to supply the starting torque, which leads to an excessive size of the hub, or it is necessary to accept overloading of the motor at the time of starting. This latter solution prevents the wheel from turning for a prolonged period at low speed unless a reduction gear with a high reduction ratio is provided. However, a limit is then set for the speed by the maximum working conditions of the electric motor. The use of electric driving wheels is particularly desirable for heavy vehicles or site appliances but it would be necessary to have available a very large range of speeds.

The present invention has for its object to obviate the aforementioned disadvantages.

In accordance with the present invention there is provided an electric driving wheel comprising an electric motor mounted in the hub of the wheel and a speed reduction gear interposed between the shaft of the motor and the rim of the wheel, which speed-reduction gear is a reduction gear with a variable reduction ratio.

For a better understanding of the invention and to show how the same may be carried into effect reference will now be made, by way of example, in the accompanying drawings, in which—

Figure 1:
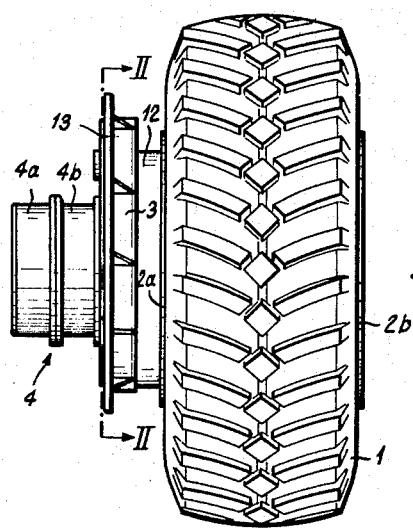
Figure 2:
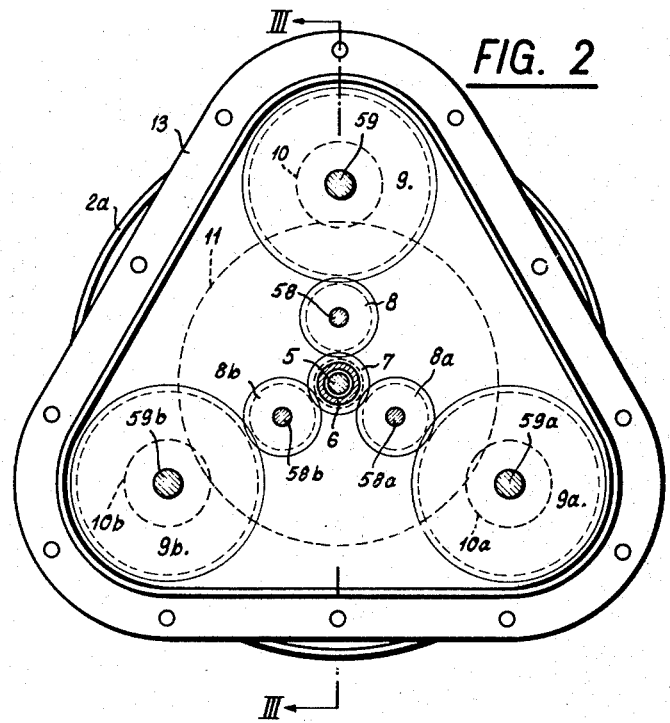
Figure 3:
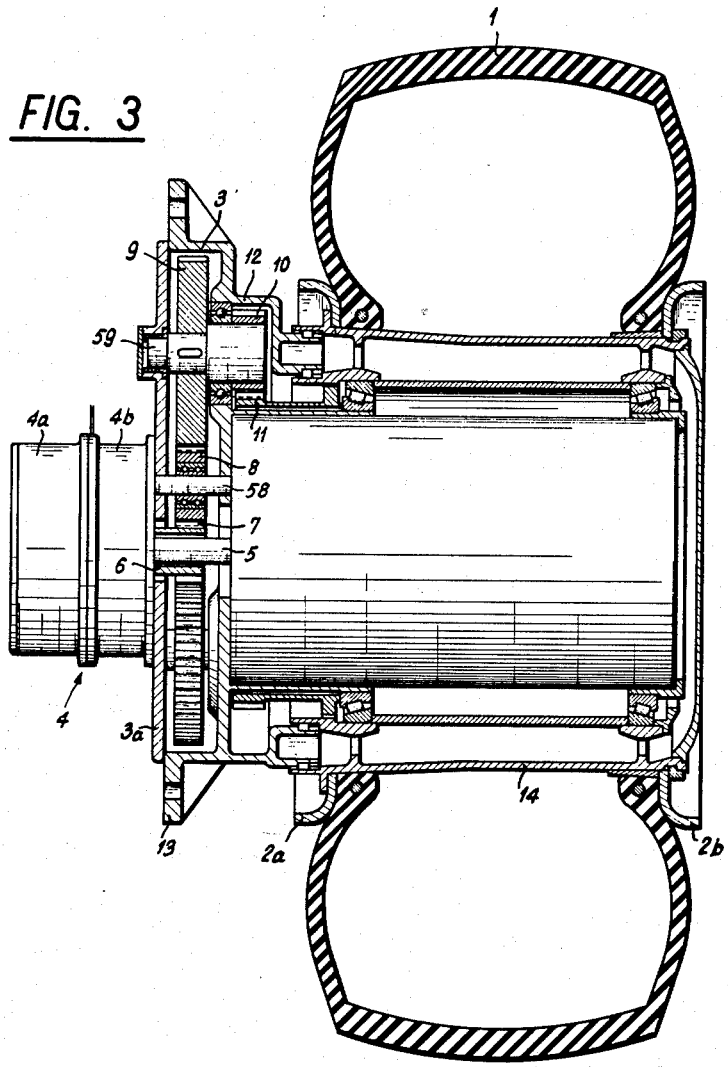
Figure 6:
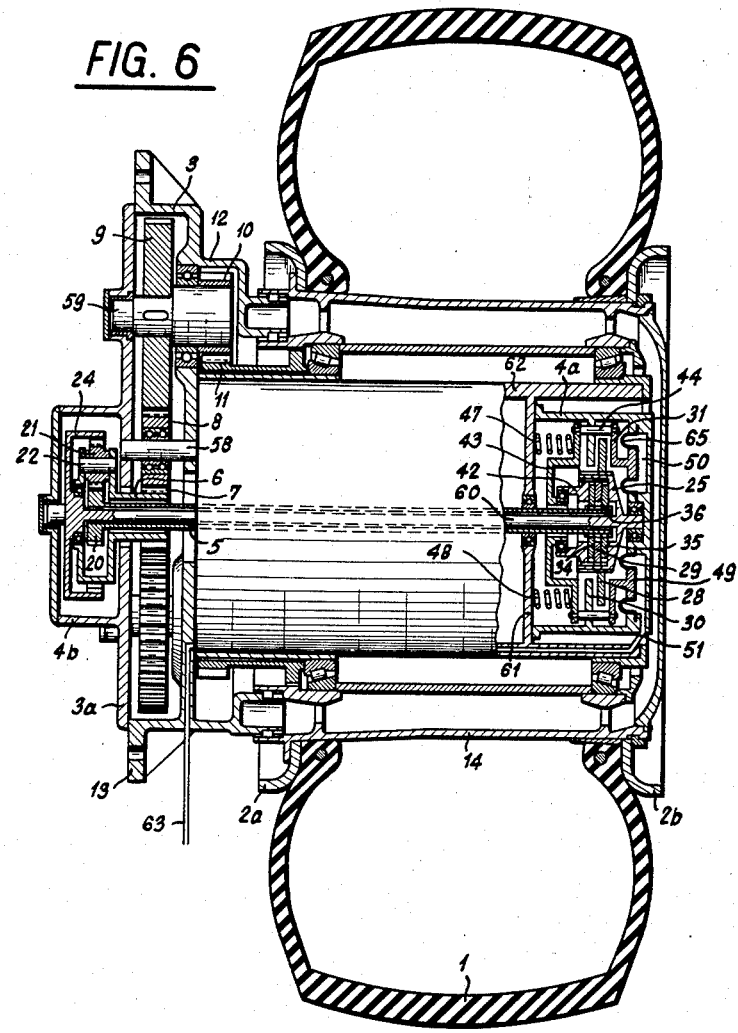

FIGURE 1 is a side view of an electric driving wheel according to the invention, FIGURE 2 is a section on the line II—II of FIGURE 1 and shows the general arrangement of the transmission, FIGURE 3 is a partial section of FIGURE 2, on the line III—III, FIGURE 4 is a section to an enlarged scale showing a detail of FIGURE 3, FIGURE 5 shows a modification thereof, and FIGURE 6 is a partial section of another embodiment of the electric driving wheel.

The illustrated electric driving wheel comprises (FIGURE 1) a pneumatic tire 1 which is mounted on a rim 14 (FIGURE 3) having two flanges $2_a$ and $2_b$. A casing 3 contains a speed-reduction gear with a fixed ratio and a casing 4 formed of two parts $4_a$ and $4_b$ contains a gear box. A flange 13 serves to secure the driving wheel to the chassis of the vehicle (not shown).

FIGURE 2 shows the general arrangement of the reduction gear with a fixed reduction ratio. 5 denotes the shaft of the electric motor, which shaft is at the same time the input shaft of the gear box, and 6 the hollow output shaft of the gear box which operates through the toothing 7 on the fixed ratio reduction gear. This latter gear is formed of three identical gear trains indicated respectively at 8, 9 and 10, $8_a$, $9_a$ and $10_a$, $8_b$, $9_b$ and $10_b$, the respective shafts thereof being indicated at 58 and 59, $58_a$ and $59_a$, $58_b$ and $59_b$. The final pinions 10, $10_a$ and $10_b$ of these gear trains mesh with a common ring gear 11, which is stationary with respect to the wheel rim and is mounted in a casing 12 (FIGURE 1), and extends through the electric driving wheel housing and motor assembly which forms a stub axle journaled to the wheel rim 14.

The gear box contained in the casings $4_a$ and $4_b$ comprises (FIGURE 4) an epicyclic gear formed by a sun gear 20 keyed on the shaft 5 of the motor, a planet carrier 23 carrying at least one shaft 22, around which rotates a planet gear 21 meshing with the sun gear 20 and a toothed ring gear 24 meshing with the planet gear or gears 21. The planet carrier 23 is provided with a hollow shaft 6 which is the output shaft of the gear box. The ring gear 24 is secured by means of a series of bolts such as 80, with a hollow hub 25 formed with external splines 26 and internal splines 27, roller bearings 81 and 82 enabling the assembly to rotate inside the casings $4_a$ and $4_b$. An internally toothed annular disc 28 meshes with the external splines 26, the disc 28 being thus movable axially but secured angularly with respect to the hollow hub. An externally toothed annular disc 29 is mounted inside the same hollow hub 25 in meshing engagement with splines 27 and disc 29 thus is movable axially but, because of the splined connection, it is prevented from moving angularly with respect to the hollow hub 25. The disc 28 is sandwiched between two angularly fixed elements: a plate 30 fast with the casing 4 and an axially movable plate 31, the two plates carrying linings 32 and 33 respectively, consisting of a material having a high coefficient of friction. The assembly of the disc 28 and of the plates 30 and 31 with their linings 32 and 33 forms a disc brake capable of stopping the ring gear 24 of the planet train. The disc 29 is sandwiched between two annular internally toothed discs 34 and 35 in sliding engagement with a splined pinion 36 fast with an extension 37 of the shaft 5, the two discs carrying linings 38, 39 and 40, 41 respectively, on their two surfaces. The stack of discs 34, 29 and 35 is completed by an externally toothed annular plate 42, in meshing engagement with the internal splines 27 of the hollow hub 25 and the assembly forms a disc clutch capable of connecting the ring gear 24 of the planet train to the sun gear 20. The plate 42 of the clutch is made fast axially with the plate 31 of the brake by means of a side plate 43 and bolts 44 and 45 distributed around the plates and slidably extending through holes formed in the casing $4_a$ externally of the plate 30. A thrust ball bearing 46 enables the side plate 43 to exert an axial force on the plate 42 of the clutch, while permitting the latter plate to turn. This axial force is exerted by resilient means, in the present instance springs 47 and 48, bearing on the cover 52 of the casing $4_a$. The plate 31 of the brake is connected to a movable wall 49 of a deformable chamber 50, into which a fluid under pressure can be admitted through a flexible pipe 51, fluid-tightness being ensured by a diaphragm 65.

The operation of the described electric driving wheel is as follows:

On starting, a fluid under pressure is admitted into the deformable chamber 50, the effect of which is to displace the movable wall 49, to cause the locking of the driven plate 28 between the plates 30 and 31 and to immobilize the ring gear 24 of the planetary train. The side plate 43, which is secured to the plate 31, is concurrently displaced, and the effect of this is to displace the plate 42 of the clutch and to free the latter. The sun gear 20 thus becomes independent of the ring gear 24 and the planetary train operates with a reduced transmission ratio between its input 5 and its output 6. The overall transmission ratio between the shaft 5 of the electric motor and the wheel rim 14 is then lower than that of the single reduction gear with a fixed ratio.

The removal of the fluid under pressure in the deformable chamber 50 enables the springs 47 and 48 to engage the clutch by acting on the plate 42 and to free the brake by displacing the plate 31. The result is that the ring gear becomes fast with the sun gear 20, which gives a transmission ratio equal to one between the input 5 and the output 6 of the gear box. The overall transmission ratio between the shaft 5 of the electric motor and the wheel rim 14 is then equal to that of the single reduction gear with a fixed ratio.

As will be seen, the electric driving wheel has the advantage of being subjected to a considerable driving torque even at slow speed without it being necessary for the electric motor to be of prohibitive dimensions. It is possible to change speed both when stationary and when moving, since this operation only requires intervention of a clutch and a brake. It is not necessary to take special precautions for synchronising the members required to cooperate and the slipping of the clutch and brake avoids any breakage of mechanical members and makes the gear changing operation silent. In addition a breakdown occurring in the control system, for example a pressure drop, a leak, etc., automatically engages the 1:1 transmission ratio under the action of the springs 47 and 48. This is an advantage when the breakdown occurs inopportunely, because the motor is then driven at a slower speed, which avoids the damage which could arise from racing.

In the embodiment which has just been described the brake, the clutch and their control means are located in a casing $4_a$ located adjacent to the casing $4_b$ containing the planet gear train. These elements, which are subject to wear, must be readily accessible for replacement purposes and the arrangement adopted, which mounts them under the bridge of the vehicle, is only acceptable if the latter is a raised bridge. If the vehicle must be equipped with a low bridge, it is advantageous to resort to the arrangement shown in FIGURE 6. In this modified arrangement, the brake, the clutch and their control means are situated at the end of the electric motor opposed to the end at which the planet gear train is situated. So that these elements need not project outside the wheel, which arrangement would necessitate a heavy protective casing in order to protect them from shocks, they are mounted inside the profile defined by the outwardly directed flange $2_b$ of the rim 14. In this arrangement the shaft 5 of the rotor of the electric motor is hollow and is traversed from one end to the other by a shaft 60 giving the required connection between the ring gear 24 of the planet gear train and the hollow hub 25 of the brake and clutch. The springs 47 and 48 bear on an internal wall 61 which is part of the frame 62 of the electric motor. The pipe 51 which supplies the fluid under pressure intended for the control of the brake plate 31 and of the clutch plate 42, extends axially through the cylindrical wall of motor frame 62 and projects radially therefrom at 63 on the inside of the wheel.

Another modified arrangement is shown in FIGURE 5. In this arrangement, the control is effected by an electromagnet, having a winding 70 mounted inside a ferromagnetic armature 71 fixed on the cover 52 of casing 4. The side plate 43 then carries a ferromagnetic armature in the form of an annular disc 72.

The embodiments described comprise a two-speed gear box formed by a planet gear train. It is obvious that other types of gear boxes can be used. Similarly it is easy to employ a gear box having a number of speeds higher than 2.

What is claimed is:
1. An electric driving wheel comprising an electric motor and housing assembly adapted to be releasably secured to a support, said motor and housing assembly forming a stub axle and said motor having a shaft, and the electric driving wheel further comprising a wheel rim surrounding said electric motor and relatively rotatably engaged with said stub axle, and a speed-reduction gear mounted within said housing and comprising a fixed ratio reduction gear assembly and a variable ratio gear box, said speed-reduction gear being coupled to said shaft of said electric motor and to said wheel rim.

2. A wheel as in claim 1 wherein the gear box comprises a planet gear train assembly.

3. A wheel as in claim 2 wherein a ring gear forming part of the planet gear train assembly may be held with respect to either a fixed part of the gear box, by means of a brake, or a sun gear forming part of the planet gear train assembly, by means of a clutch.

4. A wheel as in claim 3 wherein the gear box includes a common control member acting simultaneously but oppositely on the brake and the clutch of the planet gear train assembly so that the operation of engaging the brake frees the clutch and the operation of engaging the clutch frees the brake.

5. A wheel as in claim 4 wherein the gear box further includes at least one resilient member acting on the common control member for bringing the latter, in the absence of an external opposing force, into the position corresponding to the release of the brake and the engagement of the clutch.

6. A wheel as in claim 3 wherein the sun gear is secured to the input shaft of the gear box and the planet gear carrier is secured to the output shaft of the gear box.

7. A wheel as in claim 6 wherein the input shaft of the gear box is fast with the electric motor shaft and the output shaft of the gear box is fast with the input gear of the fixed ratio reduction gear assembly.

8. A wheel as in claim 4 wherein the brake, the clutch and the control member are situated beyond the planet gear train assembly relatively to the electric motor.

9. A wheel as in claim 4 wherein the brake, the clutch and the control member are situated at that end of the electric motor opposed to the end at which the planet gear train is situated, the electric motor shaft being hollow and being traversed by a shaft connecting the ring gear of the planet gear train assembly to the driven parts of the brake clutch.

10. A wheel as in claim 4 wherein the control member is brought into the position corresponding to the engagement of the brake and the release of the clutch by a force exerted by fluid under pressure.

11. A wheel as in claim 4 wherein the control member is brought into the position corresponding to the engagement of the brake and the release of the clutch by a force exerted by an electromagnet assembly.

References Cited by the Examiner

UNITED STATES PATENTS

| | | | |
|---|---|---|---|
| 1,370,378 | 3/21 | Starr | 180—43 X |
| 2,052,815 | 9/36 | Wilsing | 74—769 |
| 2,687,048 | 8/54 | Butler. | |
| 2,729,298 | 1/56 | LeTourneau | 180—60 |
| 2,747,429 | 5/56 | Butler | 180—10 X |
| 2,899,005 | 8/59 | Speicher | 180—10 |
| 3,090,456 | 5/63 | Blenkle | 180—10 |

A. HARRY LEVY, *Primary Examiner.*

LEO FRIAGLIA, *Examiner.*